United States Patent [19]
Hull et al.

[11] Patent Number: 5,419,606
[45] Date of Patent: May 30, 1995

[54] TRIM PANEL ATTACHING PIN WITH WATER SEAL

[75] Inventors: Edward I. Hull, West Bloomfield; Michael T. Vecchio, Livonia, both of Mich.

[73] Assignee: Ford Motor Company, Dearborn, Mich.

[21] Appl. No.: 172,772

[22] Filed: Dec. 27, 1993

[51] Int. Cl.[6] .................................................. B60R 13/02
[52] U.S. Cl. ............................ 296/146.7; 296/39.1; 280/748; 52/511; 24/297; 24/573.2
[58] Field of Search ............................ 296/39.1, 146.7; 280/748, 751; 52/511, 716.5, 718.03; 24/297, 453, 523.2

[56] References Cited

U.S. PATENT DOCUMENTS

| | | | |
|---|---|---|---|
| 3,733,655 | 5/1973 | Kolibar | 24/573.2 X |
| 3,778,958 | 12/1973 | Fowler | 52/716.6 X |
| 4,122,583 | 10/1978 | Grittner et al. | 52/511 X |
| 4,505,611 | 3/1985 | Nagashima et al. | 24/297 X |
| 4,629,356 | 12/1986 | Hayashi | 403/408.1 |
| 4,786,225 | 11/1988 | Pog et al. | 24/297 X |
| 4,890,877 | 1/1990 | Ashtiani-Zarandi et al. | 296/153 X |
| 5,039,160 | 8/1991 | Garnweidner et al. | 49/502 X |
| 5,048,234 | 9/1991 | Lau et al. | 49/502 |
| 5,056,199 | 10/1991 | Stein et al. | 24/297 X |
| 5,083,832 | 1/1992 | Ohya | 296/201 X |
| 5,090,755 | 2/1992 | Garnweidner | 293/133 |
| 5,106,223 | 4/1992 | Kraus | 24/297 X |
| 5,169,204 | 12/1992 | Kelman | 49/502 X |
| 5,173,026 | 12/1992 | Cordola et al. | 24/297 X |
| 5,362,102 | 11/1994 | Hajek et al. | 280/751 |

FOREIGN PATENT DOCUMENTS 2-231246 9/1990 Japan .

*Primary Examiner*—Dennis H. Pedder
*Attorney, Agent, or Firm*—David B. Kelley; Roger L. May

[57] ABSTRACT

A vehicle door interior assembly has an inner door panel attached to a trim panel with a plurality of pins having splines thereon which are sheared from the pins for absorbing energy to lessen the energy transfer to the vehicle interior during a collision or otherwise. The pins have a shaft with a spear shaped nose section on one end which assists in attachment of the pins to holes in the inner door panel assembly. Finger members attached near the nose section help retain the pins in the holes and are deformed or sheared from the pin shaft should the assembly separate. A water seal is attached to the shaft to prevent moisture from seeping through the holes to the passenger compartment. Under compression, the pins are forced through the holes thus shearing the splines from the shaft and convert kinetic energy of the pin to heat energy.

14 Claims, 3 Drawing Sheets

TRIM PANEL ATTACHING PIN WITH WATER SEAL

FIELD OF THE INVENTION

The present invention relates to automotive door trim panel assemblies, and, more particularly, to a retaining pin having energy absorption and moisture prevention features for attaching a vehicle interior trim panel to an inner door panel.

BACKGROUND OF THE INVENTION

Vehicle doors are typically constructed with two or more panels attached to the door frame, including an exterior panel for shielding the passenger compartment from the elements, an inner door panel which provides structural support, and a trim panel facing the passenger compartment. The trim panel is usually fastened to the inner door panel and shields the vehicle occupants from the door internal components, such as the window, the window regulator, and the door locks. Foam may be placed between the inner door panel and the trim panel to absorb energy from excessive side loading of the vehicle as in the impact loading attendant a collision, as is disclosed in U.S. Pat. No. 4,890,877 (Ashtiani-Zarandi et al.). Energy absorption is also accomplished by mounting steel straps behind the trim panel, as shown in U.S. Pat. No. 5,048,234 (Lau et al.).

Another known method for energy absorption in a vehicle door is to provide shock absorbing fasteners between the inner door panel and the trim panel, as is disclosed in U.S. Pat. No. 5,169,204 (Kelman) and Japanese Patent 231,246 (Ishikawa). These devices rely on radial compression of a portion of the fastener to effect energy absorption, unlike the present invention which relies on shearing of a portion of the pin for energy absorption.

SUMMARY OF THE INVENTION

The present invention provides an automotive door interior assembly comprising an inner door panel, an interior trim panel, and retaining means for retaining the trim panel to the inner door panel. The retaining means has panel locating means for aligning the retaining means with connection means in the inner door panel, moisture barrier means for preventing moisture seepage through the inner door panel to a space between the trim panel and the inner door panel, and shear means attached to the retaining means for absorbing energy upon movement of the retaining means through the connection means.

The connection means preferably comprises holes which shear the shear means from the retaining means upon movement through the holes. The retaining means comprises a plurality of pins having a shaft with a first end having a plurality of spaced apart longitudinal splines attached thereto. The pins also have a second end with panel locating means attached thereto, with the locating means comprising a spear shaped nose section pointing in a direction away from the first end along an axis through the shaft. The nose section assists in locating the holes during panel assembly. In addition to providing a locating function, the nose section has of a plurality of spaced apart finger members attached thereto which also provide panel retention and energy absorption functions. The finger members extend generally toward the first end and are angled away from the shaft such that the distance between finger members on opposite sides of said shaft is greater than the diameter of the hole. The finger members compress toward the shaft as the nose section is pushed through the holes and flex away from the shaft after passing through a hole to prevent retraction of the pin therefrom. The holes shear or deform the finger members upon separation of the inner door panel from the trim panel, for example, during a side impact.

The moisture barrier means comprises an umbrella shaped water seal attached to the shaft adjacent to the nose section near the second end of the shaft. The seal has a concave side facing the nose section and a diameter greater than the holes, with the concave side abutting the inner door panel so as to cover the holes. The seal cooperates with the finger members to secure the inner door panel therebetween thus connecting the pin to the inner door panel.

In the preferred embodiment, the shaft, the said water seal, the nose section, the finger members, and the splines are integrally molded as a single retaining pin from a thermoplastic material. Additionally, the preferred embodiment has an inner door panel with a reinforcing panel connected thereto on a side opposite the trim panel, with the reinforcing panel having a plurality of openings for receiving the retaining pin upon movement of the trim panel toward the inner door panel.

DETAILED DESCRIPTION OF THE PREFERRED EMBODIMENT

Figure 1:
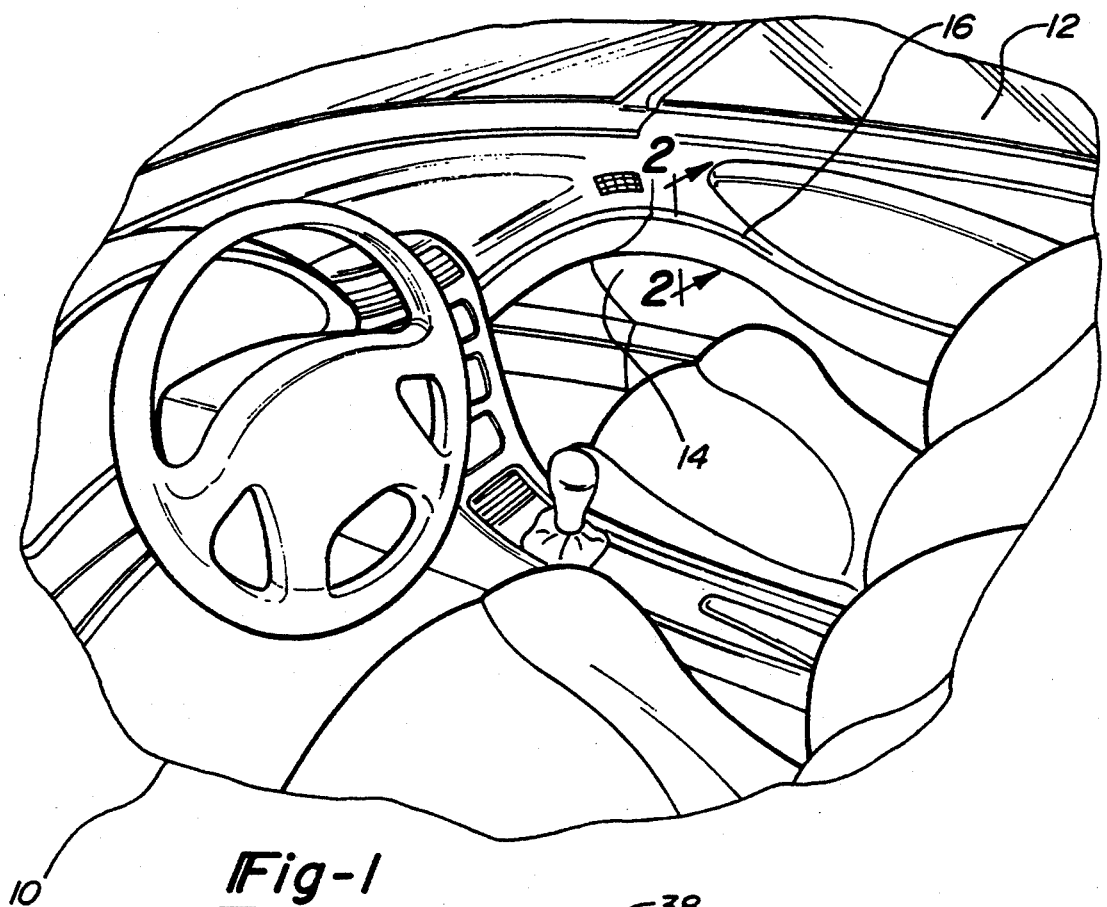
FIG. 1 is an interior view of an automobile passenger compartment showing an inner door panel assembly according to the present invention as attached to the vehicle.

Referring to the drawings and beginning with FIG. 1, a partial interior view of passenger compartment 10 of an automobile is shown with a front door 12 having an inner door panel assembly 14 including a trim panel 16 facing the interior of passenger compartment 10. It is to be understood that the door panel assembly of the present invention can be used for doors regardless of location on a vehicle, including but not limited to rear doors and tailgate doors, as well as fixed interior structural elements, such as interior trim covers.

Figure 2:
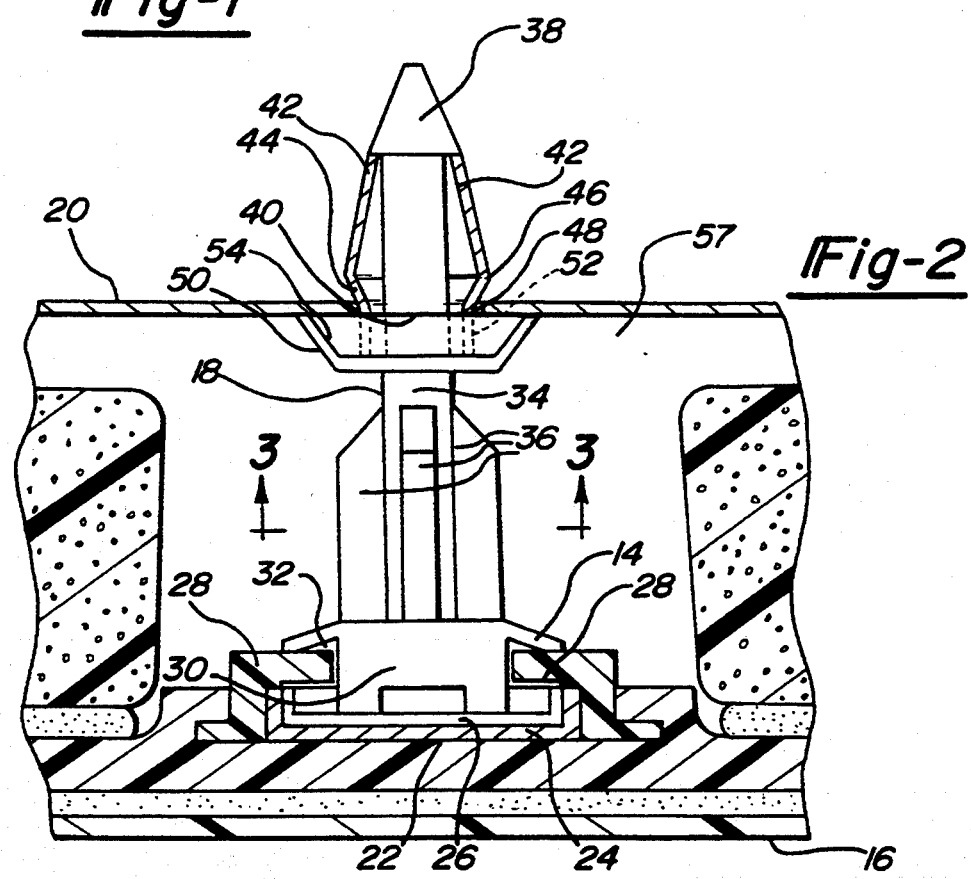
FIG. 2 is a cross-sectional view along line 2—2 of FIG. 1 showing a trim panel connected to an inner door panel by a retaining pin according to the present invention.

Referring now to FIG. 2, a cross-section of inner door panel assembly 14 is shown with retaining means, preferably retaining pin 18, for connecting trim panel 16 with inner door panel 20. Trim panel 16, which may be molded from polyurethane or other foam materials known to those skilled in the art, has mold cavity 22 for placement of receptacle ring 28 to which pin 18 attaches. Receptacle ring 28 has a cap 24 which is placed within trim panel 16 to prevent foam from entering space 26 during molding. Ring 28 is also molded into trim panel 16 for receiving base 30 of pin 18. Base 30 has annular groove 32 into which ring 28 fits to attach pin 18 to trim panel 16.

Still referring to FIG. 2, pin 18 has shaft 34 with shear means attached thereto, preferably longitudinal spaced apart splines 36, axially adjacent to base 30. Splines 36 absorb energy when sheared from shaft 34, as is further described below. Additionally, pin 18 has panel locating means 38 carried thereon at an end of shaft 34 opposite base 30 for directing pin 18 through a hole 40 of inner door panel 14 for attachment of trim panel 16 and inner door panel 14 during assembly of the automobile. Locating means 38 preferably comprises a spear shaped nose section pointing in a direction away from base 30 along an axis through the length of shaft 34.

Locating means 38 also has of a plurality of spaced apart finger members 42, or retrorse fins, attached thereto extending generally toward base 30 and angled away from shaft 34 such that the distance between finger members 42 on opposite sides of shaft 34 is greater than the diameter of hole 40 (FIG. 2). When locating means 38 is pushed into hole 40, finger members 42 are compressed toward shaft 34 to allow pin 18 to pass through. After locating means 38 have passed through hole 40, finger members 42 spring back to the spear shaped position to prevent retraction of pin 18 from hole 40. In the preferred embodiment, finger members 42 have undercut portions 44 which begin at a point 46 where finger members 42 are furthest away from shaft 34. Undercut portions 44 are angled toward shaft 34 for locking against inner surface 48 of hole 40 to prevent pin 18 from retracting therefrom.

As shown in FIG. 2, moisture barrier means, preferably comprising an umbrella shaped water seal 50, is carried with shaft 34 adjacent to finger extensions 52. Finger extensions 52 extend toward base 30 approximately parallel to shaft 34 from undercut portions 44 and serve to position and support water seal 50 as well as hold undercut portions 44 in place against hole inner surface 48. Water seal 50 has a concave side 54 with a diameter greater than hole 40 to prevent moisture from seeping into space 57 between inner door panel 20 and trim panel 16 through hole 40. Concave side 54 abuts inner door panel 20 so as to cover hole 40. Water seal 50 also cooperates with undercut portions 44 of finger members 42 to clamp pin 18 to inner door panel 20.

Figure 3:
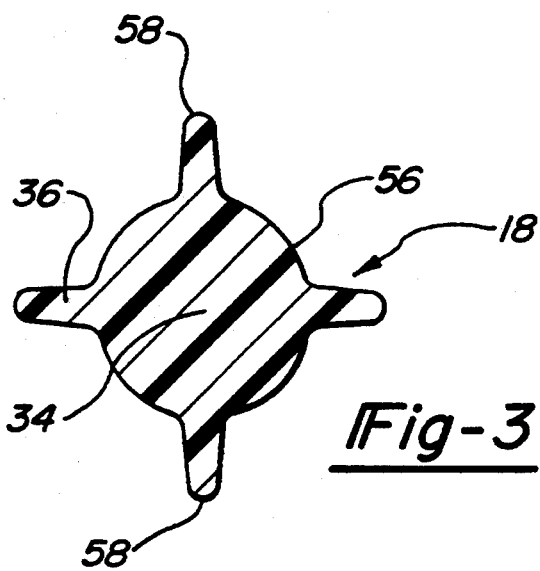
FIG. 3 is a cross-sectional view of a retaining pin according to the present invention along line 3—3 of FIG. 2 showing the pin shaft and spaced apart splines.
Figure 4:
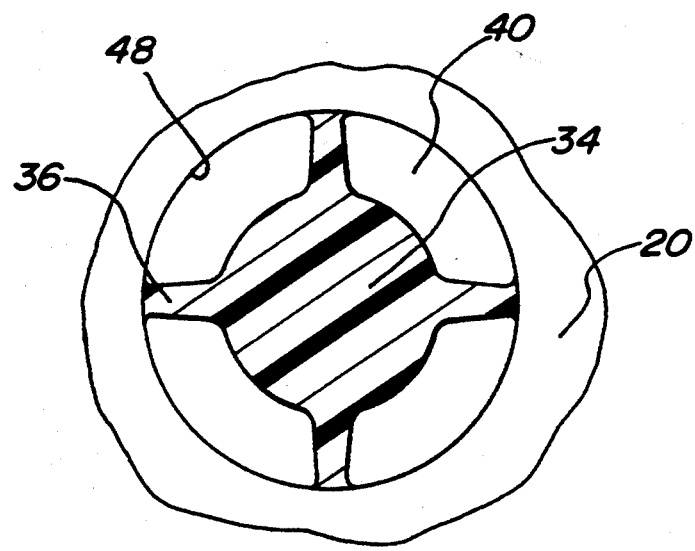
FIG. 4 is a view through a hole in the inner door panel of the panel assembly according to the present invention showing a retaining pin in cross-section with splines partially sheared off as it would appear when moving through the hole to absorb energy.

A cross-sectional view through the preferred embodiment of pin 18 is shown in FIG. 3. Shaft 34 has splines 36 on a radially outermost surface 56 thereof which are circumferentially spaced apart 90°. Spline tips 58, shown rounded, can have any geometric shape. FIG. 4 shows pin 18 in cross-section with spline tips 58 sheared off as a result of movement through inner surface 48 of hole 40 since the distance between spline tips 58 on opposite sides of shaft 34 is greater than the diameter of hole 40. The number of splines 36 on shaft 34 as well as the size of splines 36 relative to the diameter of hole 40 affect the energy absorbed by pin 18 as it moves through hole 40.

Figure 5:
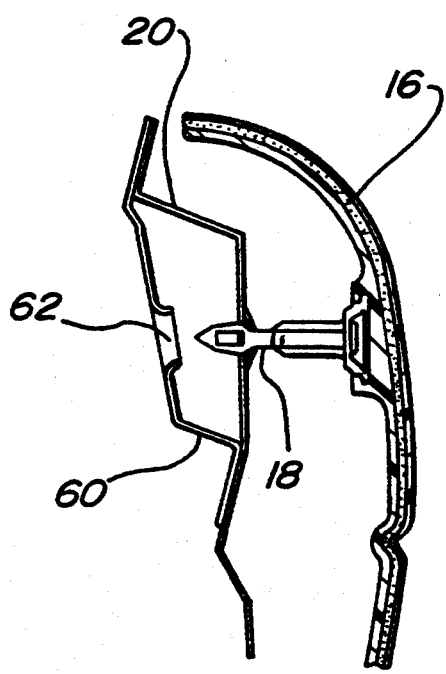
FIG. 5 is a cross-sectional view of a door panel assembly according to the present invention showing a trim panel having a retaining pin rigidly attached thereto and connected to an inner door panel.
Figure 6:
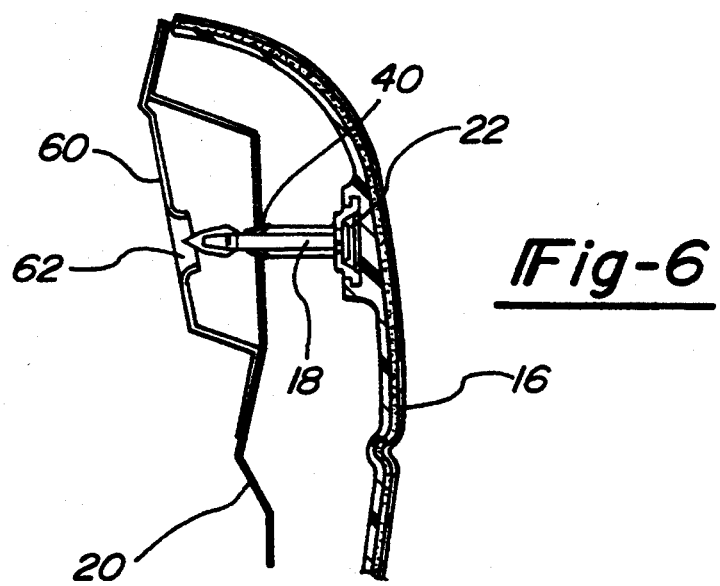
FIG. 6 is a cross-sectional view of a door panel assembly according to the present invention shown under compression with the retaining pin pushed through a connection hole in the inner door panel such that the splines are sheared from the pin shaft to absorb energy.
Figure 7:
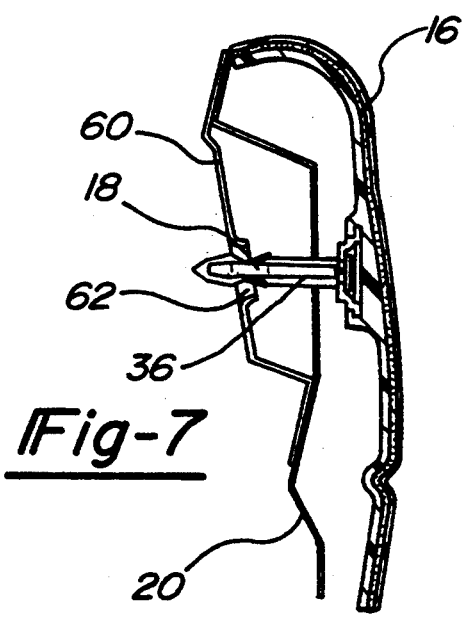
FIG. 7 is a cross-sectional view of a door panel assembly according to the present invention under compression showing an extrusion opening in a reinforcement panel receiving the retaining pin nose section.

In operation, inner door panel assembly 14 of the present invention converts the kinetic energy directed toward the passenger compartment 10, which results due to movement of pin 18 relative to inner door panel 20, to heat energy through shearing of splines 36 as pin 18 is forced through hole 40. The sequence of FIGS. 5, 6, and 7 depicts such an energy conversion when a portion of panel assembly 14 undergoes compression, for example, during a side door 12 impact or when an occupant of the vehicle strikes panel assembly 14. FIG. 5 shows a cross-sectional view of an assembled door panel assembly 14 according to the present invention with pin 18 connecting trim panel 16 to inner door panel 20 as described above. A reinforcing panel 60 is attached to inner door panel 20 on a side opposite trim panel 16. An opening hole 62 is formed in reinforcing panel 60 and aligned with hole 40 and receptacle 22 for receiving pin 18 upon movement of trim panel 16 toward inner door panel 20 when panel assembly 14 is under compression (FIG. 6). Splines 36 are sheared from shaft 34 as pin 18 moves through hole 40 (FIG. 7).

Figure 8:
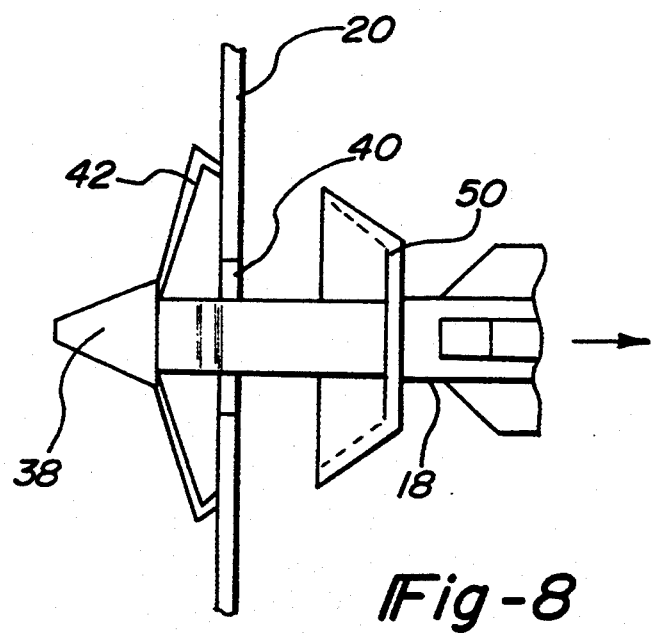
FIG. 8 is a side view of a retaining pin according to the present invention showing deformation of the finger members of the nose section after the pin has been partially retracted through the connection hole due to separation of the trim panel from the inner door panel.

When trim panel 16 and inner door panel 20 are compressed at a given area, adjacent portions of panel assembly 14 may be separated, depending on the pliability of the panels, particularly trim panel 16. Under such a condition, pin 18 may be partially retracted from hole 40 as trim panel 16 separates from inner door panel 20. When this occurs, finger members 42 deform as shown in FIG. 8. Such deformation is the result of kinetic energy of pin 18 being converted to potential energy with the deformed finger members acting as non-linear springs. In some cases, finger members 42 may be sheared from panel locating means 38 as pin 18 is pulled through hole 40.

While the invention has been described with reference to a single retaining pin 18, it is to be understood that, although not shown, a plurality of spaced apart pins 18 are attached to trim panel 16 by a plurality of receptacles 22, with the plurality of pins 18 connected to a plurality of spaced apart holes 40 in inner door panel 20 aligned with the plurality of pins 18 along an axis through holes 40 and perpendicular to inner door panel 20 when trim panel 16 is aligned for attachment therewith.

With such a panel assembly 14 just described, some kinetic energy imparted to a vehicle door will be transferred to panel assembly 14 upon impact. Part of this kinetic energy will be dissipated into heat energy, either by the shearing of splines 36 panel assembly compression or the deformation of finger members 42 when panel assembly 14 separates, thus decreasing the imparting of energy to the vehicle interior against door 12 and thereby reducing the potential for injury.

In the preferred embodiment, shaft 34, base 30, water seal 50, locating means 38, finger members 42, and splines 36 are integrally molded as a single retaining pin 18 from a thermoplastic material, such as acetyl, or other plastic or non-plastic materials known to those skilled in the art and suggested by this disclosure.

Although the preferred embodiment of the present invention has been disclosed, various changes and modifications may be made without departing from the scope of the invention as set forth in the appended claims.

We claim:

1. An automotive door interior assembly comprising:
an inner door panel;
an interior trim panel; and
retaining means for retaining said trim panel to said inner door panel, said retaining means having panel locating means for aligning said retaining means with connection means in said inner door panel, moisture barrier means carried thereon for preventing moisture seepage through said inner door panel to a space between said trim panel and said inner door panel, and shear means attached to said retaining means for absorbing energy upon movement of said retaining means through said connection means, said connection means comprising holes which shear said shear means from said retaining means upon movement through said holes.

2. A door interior assembly according to claim 1 wherein said retaining means comprises a plurality of pins each having a shaft with a first end having said shear means attached thereto comprising a plurality of spaced apart longitudinal splines, said pins also having a second end with said panel locating means attached thereto, said locating means comprising a spear shaped nose section pointing in a direction away from said first end along an axis through said shaft.

3. A door interior assembly according to claim 2 wherein said nose section has a plurality of spaced apart finger members attached thereto extending generally toward said first end and angled away from said shaft so that said pins have a wider diameter than said holes, said finger members compressed toward said shaft as said nose section is pushed through said holes and flexing away from said shaft after passing through said holes to prevent retraction of said pins therefrom.

4. A door interior assembly according to claim 3 wherein said holes shear said finger members upon separation of said inner door panel from said trim panel.

5. A door interior assembly according to claim 3 wherein said moisture barrier means comprises an umbrella shaped water seal carried with said shaft adjacent said nose section, said seal having a concave side facing said nose section and a diameter greater than each of said holes, said concave side abutting said inner door panel so as to cover said holes and cooperates with said finger members to secure said inner door panel therebetween.

6. A door interior assembly according to claim 5 wherein said shaft, said water seal, said nose section, said finger members, and said splines are integrally molded as a single retaining pin from a thermoplastic material.

7. A door interior assembly according to claim 1 wherein said inner door panel has a reinforcing panel connected thereto on a side opposite said trim panel, said reinforcing panel having a plurality of openings for receiving said retaining means upon movement of said trim panel toward said inner door panel.

8. An automotive door interior assembly comprising:
an inner door panel;
an interior trim panel;
retaining means for retaining said trim panel to said inner door panel, said retaining means comprising a plurality of pins having a shaft with a first end, said pins also having a second end with panel locating means attached thereto for aligning said retaining means with connection means in said inner door panel, said locating means comprising a spear shaped nose section pointing in a direction away from said first end along an axis through said shaft, said shaft first end having a plurality of spaced apart longitudinal splines attached thereto for absorbing energy upon movement of said retaining means through said connection means, said retaining means also having moisture barrier means for preventing moisture seepage through said inner door panel to a space between said trim panel and said inner door panel.

9. An automotive door interior assembly comprising:
an inner door panel having a plurality of spaced apart holes;
an interior trim panel having a plurality of receptacles spaced so as to be aligned with said holes along an axis through said holes and perpendicular to said inner door panel when said trim panel is aligned for attachment therewith;
a plurality of pins connected to said receptacles for attaching said trim panel to said inner door panel, said pins comprised of a shaft having a first end with shear means thereon for absorbing energy by being sheared from said shaft when said pins move through said holes upon compression of said assembly, water barrier means attached to said shaft for preventing moisture seepage through said holes to a space between said trim panel and said inner door panel, and panel locating means on a second end of said pins for aligning said pins with said holes in said inner door panel and which absorbs energy when said pins move through said holes upon separation of said trim panel from said inner door panel.

10. A door interior assembly according to claim 9 wherein said shear means are comprised of a plurality of spaced apart longitudinal splines attached to said first end, and said locating means comprises a spear shaped nose section pointing in a direction away from said first end along an axis through said shaft.

11. A door interior assembly according to claim 10 wherein said nose section has of a plurality of spaced apart finger members attached thereto extending generally toward said first end and angled away from said shaft so that said pins have a wider diameter than said holes, said finger members compressed toward said shaft as said nose section is pushed through said holes and flexing away from said shaft after passing through said holes to prevent retraction therefrom.

12. A door interior assembly according to claim 11 wherein said moisture barrier means comprises an umbrella shaped water seal attached to said shaft adjacent to said nose section, said seal having a concave side facing said nose section and a diameter greater than said holes, said concave side abutting said inner door panel so as to cover said holes and cooperating with said finger members to secure said trim panel to said inner door panel.

13. A door interior assembly according to claim 12 wherein said shaft, said water seal, said nose section, said finger members, and said splines are integrally molded as a single retaining pin from a thermoplastic material.

14. A door interior assembly according to claim 9 wherein said inner door panel has a reinforcing panel connected thereto on a side opposite said trim panel, said reinforcing panel having a plurality of openings for receiving said pins upon movement of said trim panel toward said inner door panel.

* * * * *